Patented Sept. 29, 1953

2,653,891

UNITED STATES PATENT OFFICE 2,653,891

PROCESS OF TREATING FIBROUS MATERIALS TO IMPROVE THEIR BONDS WITH RUBBER AND THE PRODUCTS THEREOF

Alexander Henderson Gentle and Thomas Jackson, Spondon, near Derby, England, assignors to British Celanese Limited, a corporation of Great Britain No Drawing. Application June 27, 1950, Serial No. 170,701. In Great Britain June 30, 1949

17 Claims. (Cl. 154—136)

This invention relates to improvements in the treatment of textile and other fibrous materials, and especially to a process for treating regenerated cellulose of high tenacity and other textile fibres so as to facilitate bonding rubber thereto.

The term "fibre" is used in this specification to include continuous filaments as well as staple fibres and the fibres of such materials as paper and wood.

For many purposes it is desired to bond rubber to cellulose or high-tenacity regenerated cellulose, for example, in making pneumatic tyres, conveyor belts, driving belts, and printers' blankets. Owing, doubtless, to the high inter-molecular cohesion of cellulose and the relative chemical inertness and non-polar character of rubber, there is little or no specific adhesion between the two, and effective bonding depends largely on mechanical anchorage of the rubber to the cotton, which is much facilitated by the rough surface of a cotton yarn. To improve the adhesion it has long been customary with some tyre manufacturers to give cotton tyre cords a so-called "gum-dip" before bonding them to the rubber. This involves dipping the cords in a solution of a somewhat degraded rubber and evaporating off the solvent. With the advent of continuous-filament of high tenacity regenerated cellulose tyre cords, the yarns of which lack the roughness of cotton yarns, it was found that although good adhesion to rubber could be obtained by providing a gum-dip, the omission of such a treatment led to poor adhesion. A similar difficulty was found in bonding rubber to fabrics of such high tenacity material, for example, in the manufacture of belting. For the benefit of those rubber-proofers and tyre-manufacturers whose process did not include a gum-dip, manufacturers of high tenacity regenerated cellulose cords and fabrics sought a treatment for those textiles which would enable them subsequently to be bonded to rubber without a gum-dip. A process that was found satisfactory in many respects was that of U. K. Patent No. 477,380.

U. K. Patent No. 477,380 describes and claims pre-treating rubber, or material to which it is to be joined, with an adhesive comprising an aqueous solution or dispersion of heat-hardening resin-forming substances, for example, phenolic compounds and aldehydes which are water-soluble to the extent of 0.5–5% by weight, drying the adhesive and converting the resin-forming substances into infusible, insoluble resins before union, or while effecting union, between the rubber and the other material.

The process of the patent as specifically described involves (as is standard practice in making heat-hardened phenol-aldehyde synthetic resins) the use of an alkaline catalyst in condensing the phenol-aldehyde, and of a molar ratio of aldehyde to phenol of more than 2:1. In what is evidently the preferred method of the patent for treating regenerated cellulose cords or fabric, rubber latex is applied conjointly with the aqueous solution of the heat-hardened resin. The patent states that comparable results cannot be obtained by the application of solutions of the same materials in organic solvents. The preferred method referred to, which comprises applying to the regenerated cellulose a mixture of rubber latex with an aqueous solution of a heat-hardening condensation product formed by alkaline condensation of formaldehyde with resorcinol in a molar ratio greater than 2:1, and converting the condensation product to an insoluble, infusible, resin during vulcanisation of the rubber, has been largely used in bonding high tenacity regenerated cellulose tyre cords to rubber, and has hitherto been considered the best method of achieving this result without recourse to a gum-dip.

We have now found that even better results can be obtained by treating the regenerated cellulose with a solution in ethanol of a water-insoluble synthetic resin obtained by condensing a phenol in the absence of an alkaline catalyst with no more than one molar proportion of formaldehyde. The formaldehyde is preferably used in the form of paraformaldehyde. An acid catalyst can be employed in the condensation; or the condensation can be carried out in the absence of any added catalyst. Possibly in this case the condensation is catalysed by traces of acid contained in the paraformaldehyde. The adhesion obtained appears to be better when paraformaldehyde is used than when formaldehyde is used in monomeric form.

We have also found that instead of ethanol, other volatile neutral organic liquids that are completely miscible with water can be used. ("Volatile" in this specification means boiling below 102° C.) Such liquids include acetone, tetramethylene oxide, dioxane, and especially methanol and isopropanol. Naturally the particular solvent must not be used with a fibrous material or a synthetic rubber for which it is a solvent or strong swelling agent.

We have further found that the treatment described can be applied with advantage to many kinds of fibrous material other than high-tenacity regenerated cellulose when strong bonds are required between these materials and rubber. Such materials include wood, paper and textile materials containing fibres of cellulose, e. g. cotton, linen, ramie, and jute, regenerated cellulose, thermoplastic cellulose derivatives such as cellulose acetate, cellulose propionate, cellulose acetate-propionate, cellulose acetate-butyrate and ethyl cellulose, polymers (including co-polymers) of acrylonitrile, co-polymers of vinyl acetate, polyamides such as nylon, polyesters such as polyethylene terephthalate, and poly-4-amino-1.2.4.-triazole. All these are materials the molecules of which comprise repeating units containing carbon, hydrogen, and an element which according to Pauling is more electronegative than carbon (see L. Pauling "The Nature of the Chemical Bond," 1940 p. 64, Table 11–3). The process of the invention is applicable broadly to such fibrous materials of this constitution as can undergo the treatment, and the subsequent vulcanisation of the rubber, without damage. To fulfill this condition the fibrous material must, of course, be resistant to at least one neutral, volatile organic water-miscible liquid which is a solvent for the resinous condensation product, and must be capable of withstanding the vulcanisation temperature without decomposition or undue softening. From the point of view of resisting vulcanising temperatures the material should preferably be capable of being heated to 180° C. without melting or decomposition.

The present invention therefore contemplates a process for treating fibrous materials the molecules of which comprise repeating units containing carbon, hydrogen and a more electronegative element than carbon, to facilitate the subsequent formation of strong bonds with rubber during vulcanisation of the rubber, which comprises impregnating the material with a water-insoluble, alcohol-soluble synthetic resin in solution in a volatile, neutral organic liquid that is completely miscible with water, and drying the material, the synthetic resin being a product obtainable by condensing formaldehyde with a phenol in molar proportions of $CH_2O$ to phenol ranging from 1:2 to 1:1, under non-alkaline conditions, and the said solution being free from any source of additional formaldehyde.

The products of the invention include rubberised fabrics and rubber-fabric laminates in which the fabric is impregnated with 0.5-2% of its weight of a synthetic resin containing combined formaldehyde and phenol, preferably resorcinol in substantially equimolar proportions, and in which the rubber has been applied with vulcanising ingredients after the resin and has been vulcanised by heating.

Excellent results are obtainable by using a synthetic resin made by heating paraformaldehyde with resorcinol in molar proportions of $CH_2O$ to resorcinol ranging from 6:7 to 1:1 in the presence of an acid catalyst. At some slight sacrifice of speed of condensation the resin can be made without added catalyst. If the initial molar ratio of $CH_2O$ to resorcinol in the reaction mixture be reduced to between 1:2 and 6:7 excellent results are again obtained, in fact some trials have shown the formation of stronger bonds by using a resin made in this way than one in which the initial molar ratio is between 6:7 and 1:1. Moreover, the condensation to give a water-insoluble alcohol-soluble synthetic resin is more easily controlled with this smaller molar proportion of $CH_2O$ and it appears likely that the shelf-life of the impregnated fabric is greater with the lower initial molar proportion.

The amount of resin left on the fabric as a result of the impregnation need be no more than 0.5% of the weight of the fabric and is preferably not more than 2% of that weight. Such small increases in weight do not result in marked stiffening of the fabric and do not result in undesirable decrease in fatigue-resistance of the yarns. These are important advantages of the process of the invention. Another great advantage is that excellent adhesion is obtained without the presence of rubber in the impregnating liquid. The use of impregnating liquids containing rubber may lead to certain difficulties, including sticking of the material to machine parts and unevenness in impregnation.

The process of the invention is of particular advantage in bonding rubber to regenerated cellulose material composed of continuous filament-yarn of tenacity at least 2.5 gms. per denier, especially yarn obtained by stretching cellulose acetate yarn in wet-steam to a tenacity of about 6 gms. per denier and subsequently saponifying the cellulose acetate under such conditions that shrinkage of the yarn can occur. Such materials may have a tenacity above 6 gms. per denier. Products of somewhat lower tenacity and greater extension can be obtained by shrinking the stretched cellulose acetate yarn, for example, in a methylene chloride benzene mixture before saponification. A further method of making high tenacity regenerated cellulose materials is to wet-spin cellulose acetate in such a way that it is highly stretched during spinning and then to saponify. Instead of stretching in wet steam or during wet-spinning, stretching may be effected in hot water or in an organic stretch-assisting agent, for example in aqueous dioxane. Other methods capable of giving high tenacity products, but generally of inferior quality to those obtained by the methods referred to above include stretching the cellulose acetate in dry steam or when heated in a dry condition by radiant heat. High tenacity regenerated cellulose materials are also obtainable by wet-spinning cellulose solutions, for example, viscose or cuprammonium cellulose with high stretch. These materials usually are of lower tenacity and behave somewhat differently from materials obtained by saponification of high tenacity cellulose acetate filaments, but the process of the invention is of advantage in bonding them to rubber and gives improved adhesion compared with the prior process referred to. The tenacity of the regenerated cellulose fibre may range from 2 gms. per denier up to 6 or more gms. per denier.

The form in which the textile material is treated will depend on the use to which the product is to be put. Thus, for example, for the construction of pneumatic tyres, tyre-cords formed by doubling heavy denier continuous filaments of high tenacity regenerated cellulose, or cords of cotton, can be treated in the form of a weft-less warp or in the form of a tyre fabric. For belting, heavy canvas fabrics of the high tenacity regenerated cellulose or of cotton are used. For printers' blankets a light-weight fabric which may be plain-woven but is preferably of a satin weave is used.

The process of the invention is of particular utility in bonding textile materials to natural rubber. The process may also be applied, however, in bonding such materials to synthetic rubbers, for example co-polymers of butadiene with a minor proportion of styrene such as GR–S, co-polymers of butadiene with a minor proportion of acrylonitrile, whether of the highly oil-resistant type e. g., "Hycar OR–15" (registered trade-mark) or of the less highly oil-resistant type e. g. "Hycar OR–25" and "Perbunan" (both registered trade-marks), co-polymers of butadiene or isoprene with isobutylene, and polymers and co-polymers of chloroprene.

The following examples illustrate the invention:

Example 1

An aqueous solution was made of the following composition, all the parts being by weight:

26.5 parts of resorcinol,
7.3 parts of paraformaldehyde,
40.2 parts of water.

Since commercial para-formaldehyde contains between 95 and 99% of formaldehyde, the molar ratio of formaldehyde to resorcinol in this solution was between 0.95:1 and 1:1.

The resorcinol was dissolved in the water at 80° C. and when completely in solution the paraformaldehyde was added with good stirring. The temperature was then raised to 100° C. over a period of 10 minutes after which cooling was applied, since the reaction is exothermic. Samples of the reaction mixture were taken at frequent intervals and tested by dropping into cold water. As soon as a sample gave a precipitate in this way the whole reaction mixture was rapidly cooled, and the resin thrown out of solution, by running the reaction mixture into cold water. The resin was then separated from the water and dissolved in industrial alcohol to give a 2% solution. A "slipper satin" fabric of weight about 6 oz./sq. yard and composed of regenerated cellulose yarn of tenacity about 6 gms. per denier made by stretching cellulose acetate yarn in wet steam and saponifying the stretched yarn, was scoured free from oil and impregnated with the 2% resin solution by padding in two stages with intermediate batching to leave 1 to 2% of resin on the fabric, and was dried on a pin-stenter.

From the fabric treated as described above, a printers' blanket was made by spreading on the fabric successive coatings of a suitable black rubber mix and vulcanising, in the same way as is done in making printers' blankets from a cotton fabric. In the blanket so obtained the adhesion between the rubber and the regenerated cellulose was found to be so strong that attempts to measure the stripping force per inch on a tensile testing machine failed owing to failure of the rubber. The same stripping test carried out on a blanket made in exactly the same way except that the resin impregnation was omitted gave a stripping force of only about 1 lb./inch. Printers' blankets made by the process described have been found to have many times the normal useful life for such articles.

Examples 2 to 4 below show the improved adhesion obtainable between the layers of a fabric-rubber-fabric belting material when the fabric is impregnated according to the invention before bonding the layers together.

In these examples the fabric was a "Fortisan" (registered trade-mark) belting duck of weight about 20 oz./sq. yard and composed of continuous filament regenerated cellulose yarn of tenacity 6 gms./denier.

Two layers of the fabric, pre-treated as described below, were bonded to an intermediate layer of a rubber mix in a press during vulcanisation of the rubber at 141° C. for 30 minutes under a pressure of 0.5 ton/sq. inch. The rubber mix had the following composition by weight:

100 parts of crepe rubber pre-masticated for 30 minutes,
1 part of phenyl beta-naphthylamine,
3 parts of sulphur,
1 part of stearic acid,
25 parts of dry zinc oxide,
1.2 parts of benzothiazyl disulphide.

The thickness of rubber between the layers of fabric was 0.037 inch.

The "stripping" force required to separate the fabric plies was determined on a tensile testing machine, and the mean of maximum and minimum values obtained was recorded in pounds per inch.

| Example | Impregnation | Weight increase due to impregnation, percent | Mean stripping force |
|---|---|---|---|
| 2 | As in Ex. 1 | 1 | 43 |
| 3 | do | 2 | 40 |
| 4 | As in British Patent No. 477,380. | 8 | 30 |
| 5 | None | None | 20 |

The impregnant of Example 4 was made by mixing rubber latex with an aqueous solution of a resin made by condensing formaldehyde with resorcinol in molar proportions of 2:1 in the presence of a small proportion of caustic soda.

In Examples 6 to 9 the fabric and the method of treatment and test were as in Example 2 except that, in making the resins the CH$_2$O:resorcinol molar ratio was 6:7, and an acid catalyst as specified in the second column of the table below was added in 10% aqueous solution to the initial reaction mixture, which was cooled to 30° C. before the addition. The padding was carried out so as to give a weight increase of 2%.

| Example | Catalyst (percent on weight of resorcinol) | Mean stripping force |
|---|---|---|
| 6 | None | 30 |
| 7 | 0.5% HCl | 35 |
| 8 | 1.0% HCl | 38 |
| 9 | 1.0% oxalic acid | 41 |

In Examples 10 and 11 the fabric and the method of treatment and testing were the same as in Example 8 except that, in making the resin, common phenol was substituted for resorcinol, and in Example 10 the formaldehyde was applied as an aqueous solution of the monomer instead of as paraformaldehyde.

| Example | Mean stripping force |
|---|---|
| 10 | 30 |
| 11 | 33 |

Example 12

The fabric and method of treatment and test were as described in Example 2 except that the molar ratio of $CH_2O$:resorcinol was 1:2. The mean stripping force was 40 lbs./inch.

For simplicity, and since the object was primarily to show the adhesion obtained, the making of a composite material having only two fabric layers has been described in Examples 2 to 12. It will be appreciated, however, that several or many fabric layers alternating with layers of rubber may be used, and generally will be used in forming heavy-duty belting.

Example 13

A slipper satin fabric of weight about 5 oz./sq. yard and composed of acetone-soluble cellulose acetate yarn was treated as in Example 1. Stripping tests on the rubberised fabric showed a stripping force ranging from 50 to 80% above that of a similar rubberised fabric made without the resin impregnation of the invention.

Example 14

A slipper satin of weight about 6 oz./sq. yard and having a warp of continuous filament nylon (polyhexamethylene adipamide) yarn and a weft of acetone-soluble cellulose acetate yarn was treated as in Example 13 and showed an increase in stripping force due to the resin impregnation within the range specified in Example 13.

Similar results are obtainable with fabrics of similar weight in which both warp and weft are of nylon and fabrics in which warp, weft or both are of poly-4-amino-1.2.4.-triazole, or of a polyester such as polyethylene terephthalate.

Example 15

A plain woven cotton fabric of weight about 5 oz./sq. yard was treated as in Example 1. The mean stripping force of the rubberised fabric was 41 lbs./inch. A similar rubberised fabric in which the resin impregnation was omitted gave a mean stripping force of 30 lbs./inch.

Instead of cotton, staple fibre yarn of regenerated cellulose made by the viscose process can be used.

Example 16

A satin fabric of weight about 7 oz./sq. yard and composed of polyacrylonitrile continuous filament yarn was treated as in Example 1. The stripping force of the rubberised fabric was estimated as 20-30% greater than that of a similar rubberised fabric in which the resin impregnation was omitted.

In the same way fabrics composed of or containing continuous filament yarns of "Vinyon N" (an acetone-soluble co-polymer of acrylonitrile with vinyl chloride) or "Vinyon" (an acetone-soluble co-polymer of vinyl chloride with vinyl acetate) can be treated. The resin impregnation of the invention gives the greatest improvement when at least 80% of the yarns of which the materials treated are composed consist of continuous-filament yarns but substantial improvement is also obtained in materials consisting wholly of staple-fibre yarns or containing 20% of such yarns.

In all the examples, ethanol can be replaced by methanol or isopropanol. It is not essential to remove all water from the reaction mixture in making the resin solution. Thus good results have been obtained when, after condensation had progressed to the desired point, as shown by the development of water insolubility, the alcohol was added without removal of the small proportion of water (less than twice the weight of the resin) present in the reaction mixture.

In the same way as is described in the examples the textile materials specified therein can be bonded to a butadiene-styrene synthetic rubber such as GR-S, a butadiene-acrylonitrile synthetic rubber such as "Hycar OR 25" or "Hycar OR 15" (registered trade-marks) or a polychloroprene synthetic rubber such as "Neoprene" (registered trade-mark).

It will be appreciated that the resinous condensation product applied in accordance with the present invention differs from the heat-hardening condensation product of the prior process in containing at the most few groups (e. g. methylol groups) per molecule, capable of forming cross-links. Indeed the resinous product used according to the present invention may be free from such groups, i. e. it may be permanently fusible. It is thought that the superior adhesion obtained is bound up with the fact that the resinous product does not form a highly cross-linked structure by self-condensation. In making the resin, however, sufficient formaldehyde may be allowed to form some cross-links and if desired, the resin-coated fabric may be given a heat-treatment (for instance, at 110-120° C. for a few minutes) with a view to forming such cross-links before bonding to the rubber. Such a treatment may be of advantage in reducing any tendency of the fabric to slip in such processes as spreading and calendering carried out before vulcanisation of the rubber.

Having described our invention, what we desire to secure by Letters Patent is:

1. Process for treating fibrous materials the molecules of which comprise repeating units containing carbon, hydrogen and a more electronegative element than carbon, to facilitate the subsequent formation of strong bonds with rubber during vulcanisation of the rubber, which comprises impregnating the material with a water-insoluble, alcohol-soluble synthetic resin in solution in a volatile, neutral organic liquid that is completely miscible with water, and drying the material, the synthetic resin being a product obtained by condensing formaldehyde with resorcinol in molar proportions of $CH_2O$ to resorcinol ranging from 1:2 to 1:1, under non-alkaline conditions, and the said solution being free from any source of additional formaldehyde and from any adhesive other than said resin.

2. Process for treating fibrous materials the molecules of which comprise repeating units containing carbon, hydrogen and a more electronegative element than carbon, to facilitate the subsequent formation of strong bonds with rubber during vulcanisation of the rubber, which comprises impregnating the material with a water-insoluble, alcohol-soluble synthetic resin, as the sole adhesive, said resin being in solution in an alcohol selected from the class consisting of methanol, ethanol and isopropanol, and drying the material, the synthetic resin being a product obtained by condensing formaldehyde with resorcinol in molar proportions of $CH_2O$ to resorcinol ranging from 1:2 to 1:1, under non-alkaline conditions, and the said solution being free from any source of additional formaldehyde.

3. Process for treating fibrous materials the molecules of which comprise repeating units containing carbon, hydrogen and a more electronegative element than carbon, to facilitate the subsequent formation of strong bonds with rubber during vulcanisation of the rubber, which comprises impregnating the material with a water-insoluble, alcohol-soluble synthetic resin, as the sole adhesive, said resin being in solution in an alcohol selected from the class consisting of methanol, ethanol and isopropanol, and drying the material, the synthetic resin being a product obtained by condensing formaldehyde with resorcinol in molar proportions of $CH_2O$ to resorcinol ranging from 1:2 to 6:7, in the presence of an acid catalyst, and the said solution being free from any source of additional formaldehyde.

4. Process according to claim 1 wherein the material treated comprises yarn of a substance selected from the class consisting of cellulose and regenerated cellulose.

5. Process according to claim 3 wherein the material treated comprises yarn of a substance selected from the class consisting of cellulose and regenerated cellulose.

6. Textile material comprising yarn of a substance selected from the class consisting of cellulose and regenerated cellulose, said material being impregnated with 0.5 to 2% of its weight of water-insoluble, alcohol-soluble synthetic resin obtained by condensing formaldehyde with resorcinol in molar proportions of $CH_2O$ to resorcinol ranging from 6:7 to 1:1 in the presence of an acid catalyst, said fabric being free from any source of additional formaldehyde and from any adhesive other than said resin.

7. Textile material comprising yarn of a thermoplastic derivative of cellulose which can be heated to 180° C. without melting or decomposition, said material being impregnated with 0.5 to 2% of its weight of water-insoluble, alcohol-soluble synthetic resin, as the sole adhesive, said resin being obtained by condensing formaldehyde with resorcinol in molar proportions of $CH_2O$ to resorcinol ranging from 6:7 to 1:1 in the presence of an acid catalyst, said fabric being free from any source of additional formaldehyde.

8. Textile material composed of yarns of which at least 80% are continuous filament yarns of acetone soluble cellulose acetate, said material being impregnated with 0.5 to 2% of its weight of water-insoluble, alcohol-soluble synthetic resin, as the sole adhesive, said resin being obtained by condensing formaldehyde with resorcinol in molar proportions of $CH_2O$ to resorcinol ranging from 6:7 to 1:1 in the presence of an acid catalyst, said fabric being free from any source of additional formaldehyde.

9. Textile material composed of yarns of which at least 80% are continuous filament yarns of regenerated cellulose of tenacity at least 2.5 g./denier, said material being impregnated with 0.5 to 2% of its weight of water-insoluble, alcohol-soluble synthetic resin, as the sole adhesive, said resin being obtained by condensing formaldehyde with resorcinol in molar proportions of $CH_2O$ to resorcinol ranging from 6:7 to 1:1 in the presence of an acid catalyst, said fabric being free from any source of additional formaldehyde.

10. Textile material composed of yarns of which at least 80% are continuous filament yarns of regenerated cellulose of tenacity at least 6 g./denier, said material being impregnated with 0.5 to 2% of its weight of water-insoluble, alcohol-soluble synthetic resin, as the sole adhesive, said resin being obtained by condensing formaldehyde with resorcinol in molar proportions of $CH_2O$ to resorcinol ranging from 6:7 to 1:1 in the presence of an acid catalyst, said fabric being free from any source of additional formaldehyde.

11. Textile material composed of yarns of which at least 80% are continuous filament yarns of a synthetic linear polymer which can be heated to 180° C. without melting or decomposition, said polymer being selected from the class consisting of polyamides, polyesters and polyaminotriazoles, said material being impregnated with 0.5 to 2% of its weight of water-insoluble, alcohol-soluble synthetic resin, as the sole adhesive, said resin being obtained by condensing formaldehyde with resorcinol in molar propotrions of $CH_2O$ to resorcinol ranging from 6:7 to 1:1 in the presence of an acid catalyst, said fabric being free from any source of additional formaldehyde.

12. Textile material composed of yarns of which at least 80% are continuous filament yarns of a synthetic linear polymer which can be heated to 180° C. without melting or decomposition and which is a polymer of acrylonitrile, said material being impregnated with 0.5 to 2% of its weight of water-insoluble, alcohol-soluble synthetic resin, as the sole adhesive, said resin being obtained by condensing formaldehyde with resorcinol in molar proportions of $CH_2O$ to resorcinol ranging from 6:7 to 1:1 in the presence of an acid catalyst, said fabric being free from any source of additional formaldehyde.

13. A woven fabric of suitable construction to provide the textile basis for a rubber-fabric belt, at least 80% of the yarns of said fabric being continuous filament yarns of regenerated cellulose of tenacity at least 6 g./denier, said fabric being impregnated with 0.5 to 2% of its weight of a synthetic resin, as the sole adhesive, said resin being obtained by condensing formaldehyde with resorcinol in molar proportions of $CH_2O$ to resorcinol ranging from 6:7 to 1:1 in the presence of an acid catalyst, said fabric being free from any additional source of formaldehyde.

14. A rubber-fabric belt in which at least 80% of the yarns are continuous filament yarns of regenerated cellulose of tenacity at least 6 g./denier and in which the rubber is bonded to the yarns solely by a synthetic resin with which said yarns are impregnated to the extent of 0.5 to 2% of their weight, said synthetic resin consisting of formaldehyde and resorcinol in molar proportions of 6:7 to 1:1 and said belt being free from any additional source of formaldehyde.

15. A rubber-fabric sheet suitable for use as a printers' blanket in which at least 80% of the yarns are continuous filament regenerated cellulose yarns of tenacity at least 6 g./denier and in which the rubber is bonded to the yarns solely by a synthetic resin with which said yarns are impregnated to the extent of 0.5 to 2% of their weight, said synthetic resin consisting of formaldehyde and resorcinol in molar proportions of 6:7 to 1:1 and said sheet being free from any additional source of formaldehyde.

16. Process for the manufacture of fabric-rubber composite material, which comprises applying a rubber-mix containing vulcanising ingredients to a textile fabric impregnated with 0.5 to 2% of its weight of water-insoluble, alcohol-soluble, synthetic resin, as the sole adhesive, said resin being obtained by condensing formaldehyde with resorcinol in molar proportions of $CH_2O$ to resorcinol ranging from 6:7 to 1:1 in the presence of an acid catalyst, and vulcanising the rubber in the absence of any additional source of formaldehyde.

17. Process according to claim 16, wherein the textile fabric is composed of yarns of which at least 80% are continuous filament yarns of an artificial organic substance that can be heated to at least 150° C. without melting or decomposition, said substance being selected from the class consisting of regenerated cellulose, thermoplastic derivatives of cellulose, linear polymers of acrylonitrile and linear polyamides, polyesters and polyaminotriazoles.

ALEXANDER HENDERSON GENTLE.
THOMAS JACKSON.

References Cited in the file of this patent

UNITED STATES PATENTS

| Number | Name | Date |
| --- | --- | --- |
| 2,449,180 | Schroeder | Sept. 14, 1948 |
| 2,497,454 | Illingworth et al. | Feb. 14, 1950 |

OTHER REFERENCES

The Chemistry of Commercial Plastics, Wakeman, 1947, pp. 115–125.